May 7, 1946.   C. A. PERSONS   2,399,888
PEDAL CONSTRUCTION
Filed Feb. 3, 1944

INVENTOR
Charles A. Persons
By *Charles R. Fay*
ATTY.

Patented May 7, 1946

2,399,888

UNITED STATES PATENT OFFICE 2,399,888

PEDAL CONSTRUCTION

Charles A. Persons, Worcester, Mass., assignor to Persons-Majestic Manufacturing Company, a corporation of Massachusetts Application February 3, 1944, Serial No. 520,916

3 Claims. (Cl. 74—594.4)

This invention relates to pedals for bicycles, etc., and particularly to the axle bearing sleeve therefor.

Objects of the invention include the provision of a less expensive pedal, this result being due to the construction of the axle sleeve in the form of tubing deformed by relatively simple means to the desired shape and including bearing cups at the ends of the sleeve, this sleeve being stronger and steadier than those heretofore made by assembling separate cups with a straight cylindrical hollow element, and avoiding the inherent looseness and wabble of the latter; the provision of a stronger and cheaper pedal having a unitary axle sleeve provided with integral relatively enlarged end bearing cups, all made from plain tubing in one piece and wherein the sleeve tapers from end to end for added strength at the crank end of the pedal where the strength is needed, said tapered sleeve also enhancing the appearance of the pedal and resulting in a more salable article at less cost to the public and of greater serviceability; and the provision of an improved, less costly pedal having an axle sleeve in the form of a tube which tapers from a larger end near the crank to the outer free end of the pedal, said sleeve having enlarged bearing cups at each end, said cups being integral with the sleeve.

Other objects and advantages of the invention will appear hereinafter.

Figure 1:
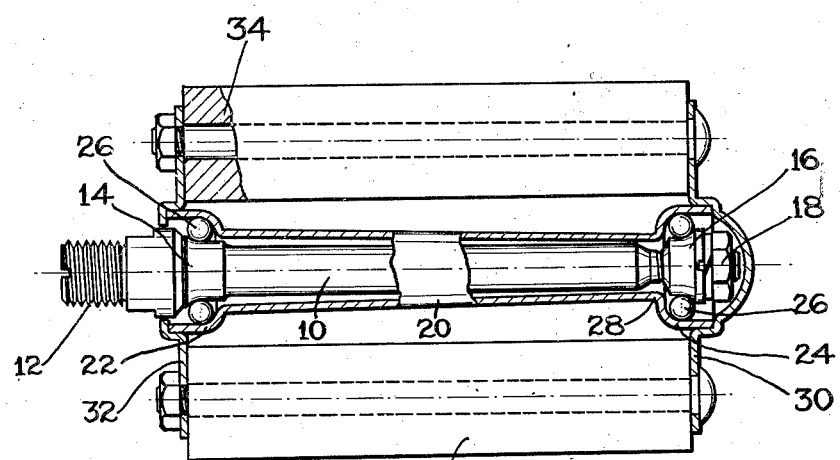
Figure 2:
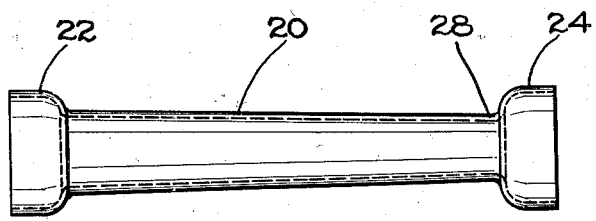

Reference is to be had to the accompanying drawing in which:

Fig. 1 is a longitudinal section through a pedal according to the invention; and Fig. 2 is an elevation of the axle sleeve.

The pedal is adapted to rotate on a shaft or axle 10 having means such as threads 12 for attachment to the crank of the cycle. At the crank end of the axle it is provided with an annular concave surface 14 forming an integral cone. As illustrated, the opposite, free end of the axle is screw threaded to adjustably receive a separate cone 16 which may be locked in position by a nut 18 and corresponding lock washer. However, any suitable locking means may be used in conjunction with the cone. The axle 10 may be straight sided as shown or tapered if desired.

A bearing sleeve 20 is formed from simple tubing by deforming the same to provide relatively enlarged annular cups 22 and 24 at the ends thereof. These cups may be of the same diameter and cooperate with the cones to provide bearing races for balls 26.

By this means an extremely strong and sturdy one-piece bearing sleeve, axle and bearing assembly is provided without complicated and expensive machining operations while at the same time retaining all the beneficial attributes of prior art devices. At the same time the crank end of the assembly should be strengthened since the stress on the pedal tends to pivot it about the crank end thereof. This invention contemplates tapering the bearing sleeve 20 down from its larger diameter at cup 22 to cup 24 thus in effect bracing the spindle in the region of cup 22. This tapering is easily accomplished during deformation of the original tube to provide the bearing cups.

The shaft or axle 10, although of uniform diameter, is spaced from the inside of the sleeve at the narrowest point of the latter adjacent the shaft. The point 28 indicates the smallest inside diameter of the sleeve and illustrates the fact that cup 24 may be deformed more deeply than cup 22. The axle 10 may be tapered to conform more closely to the taper of the sleeve but this is not necessary and involves extra cost in manufacture.

The remainder of the pedal comprises crossplates 30 and 32 which support pedal rods and tread elements 34, these parts being largely conventional and well-known.

The construction described results in a pedal having perfect bearing alinement as the bearing cups are fixed relative to each other and cannot wabble as in conventional pedals. There is always great strain on the pedals in use of a bicycle and this strain tends to adversely affect the bearing alinement and to pinch and thus destroy the bearings after wear. With the usual three-part construction, there is nothing to prevent distortion, but, with the integral, one piece device herein disclosed, the bearings will be retained in alinement at all times regardless of hard usage, falling over of the bicycle, or strain on the pedals.

It will be clear from the above that this invention provides a cheaper, sturdier, and longer lasting pedal affording an improvement in the art both from the standpoint of the consumer as well as that of the manufacturer.

Having thus described my invention and the advantages thereof, I do not wish to be limited to the details herein disclosed, otherwise than as set forth in the claims, but what I claim is:

1. A bearing sleeve for cycle pedals comprising a tapering tube having substantially equal diameter end cups formed thereon and extending radially therefrom along curves forming parts of ball races, the material of said tube, end cups, and the areas at the curves being of substantially the same thickness, and means completing the ball races.

2. A cycle pedal comprising a shaft, bearing races adjacent the ends of the shaft, a bearing sleeve surrounding the shaft, integral bearing cups on the sleeve cooperating with the races to retain bearings, a cross plate at each end of the bearing sleeve, said cross plate mounting pedal rods, one of said cross plates extending across a bearing cup and enclosing the same, both cross plates being secured to the bearing sleeve for rotary motion therewith on the shaft, the bearing sleeve having a uniform wall thickness from end to end.

3. A cycle pedal comprising a shaft, bearing races adjacent the ends of the shaft, a bearing sleeve surrounding the shaft, integral enlarged bearing cups on the sleeve to retain bearings with said races, said sleeve tapering between the cups, a cross plate at each end of the bearing sleeve, said cross plates mounting pedal rods, one cross plate extending across a bearing cup and closing the same, both cross plates being secured to the bearing sleeve for rotary motion therewith on the shaft, said shaft extending outwardly of the other bearing cup and cross plate, said bearing sleeve having a substantially uniform wall thickness from end to end thereof.

CHARLES A. PERSONS.